United States Patent Office 3,677,919
Patented July 18, 1972

3,677,919
ELECTROLYTIC PROCESS AND APPARATUS FOR RECOVERING NICKEL FROM ASBESTOS ORE
Richard Payson Fowler, Somerville, N.J., assignor to Johns-Manville Corporation, New York, N.Y.
Filed Nov. 23, 1970, Ser. No. 91,835
Int. Cl. C22d 1/14; C23b 5/08
U.S. Cl. 204—113       5 Claims

ABSTRACT OF THE DISCLOSURE

Nickel is leached from asbestos ore material by a solution of iodine in a liquid solvent for iodine, such as methyl alcohol. Direct current is applied to the resulting nickel containing solution to deposit a nickel compound onto the cathode of an electrolytic cell where it can be collected, and to deposit iodine molecules at the anode. The deposited iodine molecules redissolve in the solvent solution to form a heavy fraction which can be withdrawn from the electrolytic cell and reused in the leaching step. Apparatus is provided for recovering nickel from a finely divided asbestos ore material feed in accordance with the invention. The apparatus includes a leaching vessel containing a solution of iodine in a solvent, an electrolytic cell, conduit means connecting the electrolytic cell and the leaching vessel, collection means positioned below the anode of the electrolytic cell for recovering an iodine-rich solution from the electrolytic cell and recycle conduit means for recycling the iodine-rich solution to the leaching vessel.

FIELD OF THE INVENTION

This invention relates to an electrolytic process for obtaining a concentrated nickel containing product from asbestos ore. More particularly, the invention relates to an electrolytic process for concentrating the nickel found in asbestos ore in low weight percentages as awaruite particles (FeNi₃).

BACKGROUND OF THE INVENTION

Nickel is present in small amounts in some asbestos ores in the form of awaruite, a metallic alloy with iron (FeNi₃). For example, the concentration of nickel in tailings from asbestos ore milling operations may be about 0.2% by weight. In general, granular fractions obtained from asbestos milling operations tend to contain more nickel than fibrous materials and sifter undersizes. It should be noted, however, that the nickel content of asbestos ore found within specific locations within the same mine can vary widely.

Nearly the entire nickel content of chrysotile asbestos ore is in the form of particles of awaruite which are intimately associated with other materials including the fibrous chrysotile asbestos and serpentine rock. Small quantities of magnetite are also usually found in the ore.

The awaruite is magnetic and can, like the magnetite, be magnetically concentrated from the screen undersize material resulting from milling asbestos ore. However, much serpentine rock remains with the magnetically separated material, which precludes successful smelting operations.

Various chemical extraction methods have been tested for use in removing nickel from asbestos ore or asbestos ore residues. However, such methods have required the consumption of large quantities of costly chemicals, or have encountered other difficulties. Because of a continuously rising demand for nickel, there has been a continuing search for improved methods of concentrating the nickel present in asbestos ore.

OBJECTS OF THE INVENTION

It is an object of the invention to chemically extract nickel from asbestos ore in a commercially feasible operation.

Other objects may be apparent from the following description of the invention.

SUMMARY OF THE INVENTION

The invention provides a process of recovering nickel from asbestos ore material in which finely divided asbestos ore material is leached with a solution of iodine in a solvent for iodine, such as methyl alcohol. The solution containing the leached nickel is charged to an electrolytic cell and direct current is passed through the cell to deposit nickel at the cathode and iodine molecules at the anode. The deposited iodine is permitted to redissolve in the solvent and an iodine-rich solution suitable for reuse in the leaching step is withdrawn from the cell.

Preferably, if the iodine-rich solution is continuously recycled to the leaching operation, the iodine-rich solution is withdrawn from the electrolytc cell at a location directly below the anode.

The invention also provides an apparatus for concentrating nickel from a feed material of finely divided asbestos ore comprising a leaching vessel filled with a solution of iodine in a solvent, an electrolytic cell including a cathode and an anode; conduit means connecting the electrolytic cell and the leaching vessel to permit flow of a nickel containing solution from the leaching vessel to the cell; and collection means positioned below the anode for removing an iodine-rich solution from the electrolytic cell.

Preferably, the apparatus includes recycle conduit means for recycling the iodine-rich solution from the electrolytic cell to the leaching vessel.

The invention permits unexpectedly efficient use of a fairly costly chemical extractant, elemental iodine. The invention thus produces surprising economies in the production of nickel from asbestos ore tailings, as compared to any other process using iodine as the extractant. The invention permits the recovery and recycling of the majority of the iodine used in the process and thus possesses the potential for economical recovery of nickel from low grade ore materials.

DETAILED DESCRIPTION OF THE INVENTION

Figure 1:
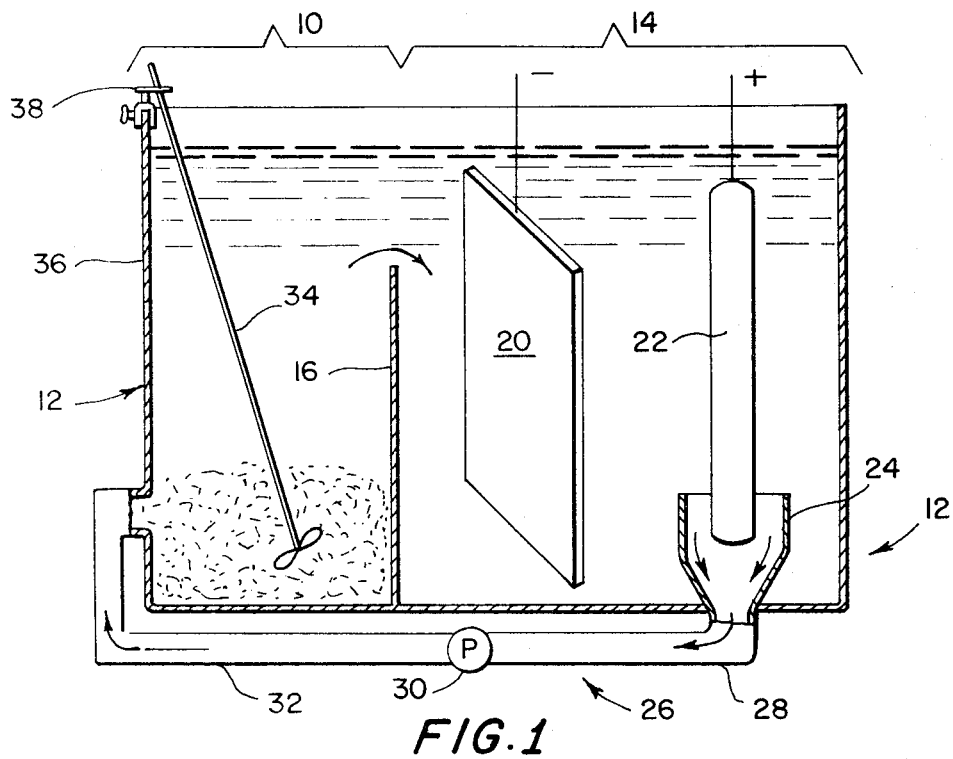
FIG. 1 is a schematic representation of an embodiment of the apparatus of the invention.
Figure 2:
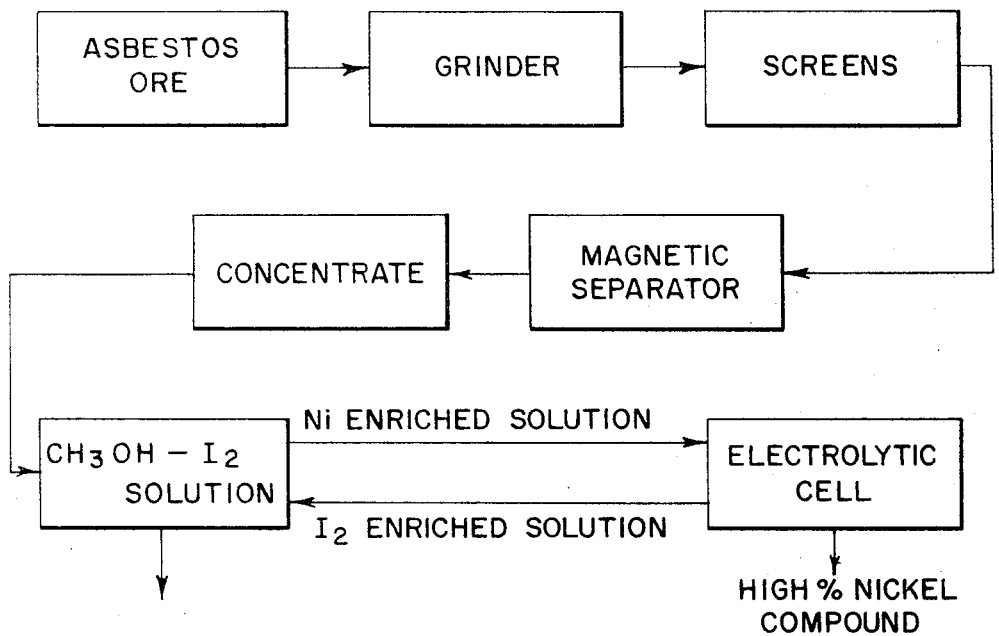
FIG. 2 is a flow diagram that illustrates the process of the invention.

The process of this invention is useful for producing a purified nickel product from particles of awaruite (FeNi₃) found in asbestos ore, and in the tailings resulting from asbestos ore milling procedures. Though the feed material to the process may contain extremely low percentages of awaruite, it is desirable to magnetically concentrate asbestos ore tailings prior to the use of the process of the invention and to select asbestos ore tailing materials that possess as high a percentage of nickel as is readily available. Generally, in selecting the desirable asbestos ore tailings for magnetic concentration, granular fractions are preferred because they possess a somewhat higher nickel content than fibrous materials and sifter undersizes from the same mine.

Preferably, the starting tailings material has been subjected to fiberization and screening operations and only the undersize material from the screening is utilized. However, it may sometimes be advantageous to further crush and process oversize fractions from asbestos ore milling operations.

If the asbestos ore tailing materials contain a significant amount of asbestos fiber, it is desirable to fiberize this material and remove it before proceeding with a magnetic separation operation, as described below. Magnetic separation is hindered by the presence of fibrous material which tends to bind the awaruite and serpentine particles together, or to trap small magnetic particles. A screening with aspirating step, in some instances combined with air separation, aids in putting the tailing materials into the optimum granular, fiber-free condition for magnetic separation. Preferably, the feed particle size is between 10 and 100 mesh prior to the magnetic separation operation, and the feed contains a minimum of fiber.

The finely divided asbestos tailings are magnetically separated to obtain a magnetically attracted, nickel-enriched fraction. This magnetic separation can be accomplished by commercially available equipment such as an enclosed belt-type magnetic separator manufactured by Eriez Manufacturing Company, and a high intensity, induced roll magnetic separator manufactured by Carpco Manufacturing, Inc.

In accordance with the invention, the nickel-enriched fraction which results from the magnetic separation operation is subjected to a leaching operation using a solution of iodine in a liquid that is a solvent for iodine. Methyl alcohol is the presently preferred solvent, but other liquids which will dissolve iodine can be utilized. In general, iodine is readily soluble in liquids possessing low polarity such as carbon tetrachloride and carbon disulfide. Iodine is also soluble in alcohols generally. A variety of physical procedures can be used during the leaching operation, and the time, temperature, iodine concentration, and other process variables utilized in the leaching operations can also vary widely. For example, the feed material can be refluxed with an alcohol-iodine solution, or the finely divided ore material can be kept in suspension by continuously agitating a solution of iodine in alcohol.

Preferably, when the solvent selected is methanol, the leaching solution is a dilute solution of from 0.3 to 4.0 parts of iodine per 100 parts of methanol. The weight ratio of feed material to leaching solution is usually maintained at from 2 to 20 parts of feed material per 100 parts of leaching solution and preferably at from 5 to 10 parts of feed material per 100 parts of leaching solution.

In accordance with the invention, the solution containing the leached nickel is charged to an electrolytic cell and a direct current voltage is applied across the cell. A relatively pure nickel compound is deposited on the cathode and is collected. Iodine ions are attracted to the anode where they are oxidized to elemental iodine. The elemental iodine almost immediately dissolves in the solvent. As the leached nickel is deposited on the cathode and leaves the solution, the lowered concentration of nickel in the solution approaches a value which permits efficient leaching of more nickel from a new batch of feed material.

The iodine which is formed at the anode dissolves in the solvent and forms a more dense solution which tends to flow to the bottom of the electrolytic cell.

In accordance with the invention, the iodine-rich solution is withdrawn from the electrolytic cell for reuse in the leaching operation. The iodine-rich solution can be withdrawn periodically or continuously from the electrolytic cell. If the withdrawal operations are continuously conducted, the solution is preferably withdrawn at a point located beneath the anode, because of the tendency of the iodine-rich solution containing redissolved iodine to settle directly below the anode.

With reference to FIG. 1, there is illustrated an apparatus which is capable of performing the process of the invention on a semi-continous basis. Periodically, the leaching operation must be stopped to remove spent feed material and the nickel collected at the cathode. Fresh feed material can be added continuously or periodically to the leaching vessel.

In accordance with the apparatus of the invention, a leaching vessel is provided which is filled with the solution of iodine and solvent. As illustrated in the embodiment of FIG. 1, a leaching vessel 10 is provided which is one compartment of a larger open-top container generally 12 that also includes a compartment housing an electrolytic cell 14.

Electrolytic cell 14 is separated from leaching vessel 10 by a common wall 16 which forms a part of the wall surface of both cell 14 and vessel 10. A conduit means is formed by the side walls of container 12 and the top of wall 16 that provides a flow path and permits nickel-containing solution to flow from leaching vessel 10 to electrolytic cell 14.

Preferably, and as shown in FIG. 1, the cathode 20 of electrolytic cell 14 is positioned closer to the point where fresh nickel-containing solution enters the cell than the anode 22.

In accordance with the invention, collection means are positioned below the anode for recovering an iodine-rich solution from the electrolytic cell. The collection means are positioned below the anode because an iodine-rich solution has a higher specific gravity than a solution containing less iodine. Thus, the placement of the collection means below the anode aids in recovering a more concentrated solution if solution is periodically or continuously withdrawn from the cell for recycling while voltage is being applied to the cell.

As illustrated in the embodiment of FIG. 1, the collection means comprises a funnel-shaped member 24 having an open top into which anode 22 extends, and an open bottom which is connected to the recycle conduit means, described below.

The recycle conduit means connect the collection means and the interior of the leaching vessel to provide a flow path for recycling the iodine-rich solution from the collection means to the leaching vessel. As illustrated in the embodiment of FIG. 1, the recycle conduit means includes in series, a first length of pipe 28, a pump 30, and a second length of pipe 32. In the embodiment of FIG. 1, the pump 30 provides a driving force which causes solution to flow from leaching vessel 10 into electrolytic cell 14 and, further, aids in the collection of iodine-rich methyl alcohol in collection means 24 since the inlet end of pump 30 is connected to the collection means and creates a suction head in the collection means. In the embodiment of FIG. 1, the level of methyl alcohol solution is the same in both leaching vessel 10 and electrolytic cell 14. However, it can be seen that a pump could be installed in a conduit means connecting the leaching vessel and electrolytic cell, rather than in the recycle conduit means, and that the levels of the solution in the leaching vessel and the electrolytic cell can be varied.

In the embodiment of FIG. 1, an agitation means 34 is mounted on a side wall 36 of leaching vessel 10 by a clamp 38.

For a clearer understanding of the invention, specific examples of it are set forth below. These examples are illustrative and are not to be understood as limiting the scope and underlying principles of the invention in any way. All percentages listed in the specification and claims are weight percentages unless otherwise noted. All screen sizes are U.S. Standard unless otherwise noted.

EXAMPLE 1

A quantity of 28 mesh granular undersize material from a Canadian asbestos mill is magnetically concentrated, micropulverized, dry screened, and the 200 mesh undersize is again magnetically separated. The final concentrate has a nickel content of 3.5%.

Two grams of the above concentrate is refluxed with 0.3 gram of $I_2$ and 25 cc. of methanol for 30 minutes.

The solution is then electroplated using a potential of 10 volts and 0.065 gram of a green deposit forms on the cathode while elemental iodine forms at the carbon anode. The cathode deposit is ignited at 1800° F. and drops in weight to 0.035 gram. Analysis of this material shows it contains 50% Ni, and 10% Fe.

The methanol-iodine solution is subsequently reused to leach nickel from another batch of nickel-containing concentrate.

EXAMPLE 2

Two grams of the magnetic concentrate, perpared as in Example 1, is refluxed for 30 minutes with 25 cc. of methanol and 1.0 gram of $I_2$. The solution is electroplated until the rate of deposition is negligible at which time 0.160 gram is deposited on the cathode. After ignition, the weight of the deposit is 0.086 gram and is analyzed as having 45% Ni and 14% Fe.

EXAMPLE 3

Two grams of the same concentrate prepared in Example 1 is allowed to stand in a solution of 70 cc. of methanol and 0.2 gram $I_2$. After several days, the solution is electroplated giving a deposit weighing 0.131 gram. After ignition, the deposit weighs 0.063 gram and is analyzed as containing 50% Ni and 6% Fe.

What is claimed is:

1. A process of recovering nickel from asbestos ore material comprising:
   (a) leaching finely divided asbestos ore material with a solution of iodine in an organic solvent;
   (b) charging the solution containing the leached nickel to an electrolytic cell;
   (c) passing direct current through the cell to deposit nickel at the cathode and iodine molecules at the anode;
   (d) redissolving the deposited iodine in the solvent; and
   (e) withdrawing from the cell an iodine-rich solution suitable for reuse in the leaching step.

2. The process of claim 1 in which the asbestos ore material prior to the leaching step is subjected to a magnetic separation operation to recover a nickel-rich fraction which is then subjected to the leaching operation.

3. The process of claim 1 in which the iodine-rich solution is withdrawn from the electrolytic cell at a location directly below the anode and continuously recycled to the leaching operation.

4. The process of claim 3 in which the solvent is methyl alcohol and the iodine concentration in the solution used to leach the ore material is maintained above 0.2% by weight.

5. The process of claim 4 in which fresh feed material comprising finely divided asbestos ore is continuously fed to the leaching operation.

References Cited
UNITED STATES PATENTS

| | | | |
|---|---|---|---|
| 682,061 | 9/1901 | Grollet | 75—102 |
| 857,927 | 6/1907 | Dow et al. | 204—113 |
| 1,067,698 | 7/1913 | Wells et al. | 204—113 |
| 2,304,823 | 12/1942 | Harrison | 75—118 |
| 3,018,176 | 1/1962 | Zima | 75—118 |

FREDERICK C. EDMUNDSON, Primary Examiner

U.S. Cl. X.R.

75—101, 119; 204—49